United States Patent [19]

Ikeda et al.

[11] Patent Number: 4,649,611

[45] Date of Patent: Mar. 17, 1987

[54] METHOD OF AND APPARATUS FOR POSITIONING COMPRESSOR SCROLL MEMBER

[75] Inventors: Mitsuo Ikeda; Kazumi Aiba; Tetsuya Arata, all of Shimizu, Japan

[73] Assignee: Hitachi, Ltd., Tokyo, Japan

[21] Appl. No.: 804,604

[22] Filed: Dec. 4, 1985

[30] Foreign Application Priority Data

Dec. 5, 1984 [JP] Japan ................................ 59-255623

[51] Int. Cl.[4] ........................ B23P 15/00; B23P 21/00; B23Q 16/00

[52] U.S. Cl. ................................. 29/156.4 R; 29/407; 29/709; 29/720; 418/55

[58] Field of Search .................. 29/156.4 R, 407, 434, 29/526 R, 705, 709, 720; 418/55, 57, 107

[56] References Cited

U.S. PATENT DOCUMENTS

| | | | |
|---|---|---|---|
| 3,884,599 | 5/1975 | Young et al. | 418/55 |
| 4,464,826 | 8/1984 | Bain | 29/705 X |
| 4,548,556 | 10/1985 | Terauchi | 29/156.4 R X |
| 4,552,517 | 11/1985 | Shimizu | 29/156.4 R X |
| 4,575,319 | 3/1986 | Terauchi | 29/156.4 R X |

*Primary Examiner*—Mark Rosenbaum
*Assistant Examiner*—Ronald S. Wallace
*Attorney, Agent, or Firm*—Antonelli, Terry & Wands

[57] ABSTRACT

A method and an apparatus for automatically positioning stationary and orbiting scroll members of a scroll-type fluid machine. The method comprises temporarily positioning the scroll members; causing the orbiting scroll member to progressively orbit with respect to the stationary scroll member held at the temporary position and detecting, when wraps of the scroll members are made to contact each other, the degree of contact of the scroll wraps; detecting the direction of contact between both wraps when both wraps are made to contact each other; inputting the data concerning the degree of contact and the direction of contact to a computing means such as to move the stationary scroll member in X- and Y-axis directions by amounts corresponding to the degree and direction of contact, thereby to avoid the contact between the wraps of both scroll members; and, while the stationary scroll member is held at the position where the contact is avoided, inserting bolts to bolt holes formed beforehand in both scroll members, thereby fastening both scroll members.

9 Claims, 9 Drawing Figures

FIG. 3·1a
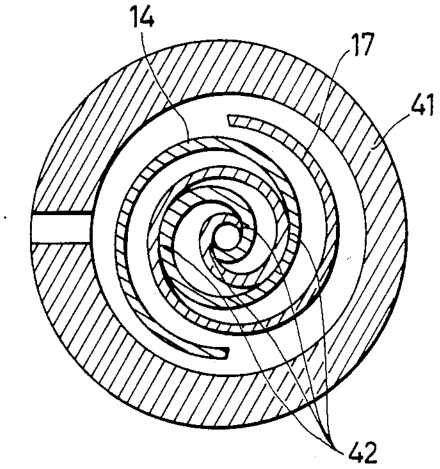
FIG. 3·2a
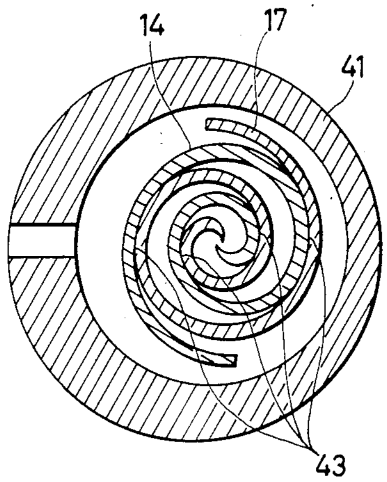
FIG. 3·1b
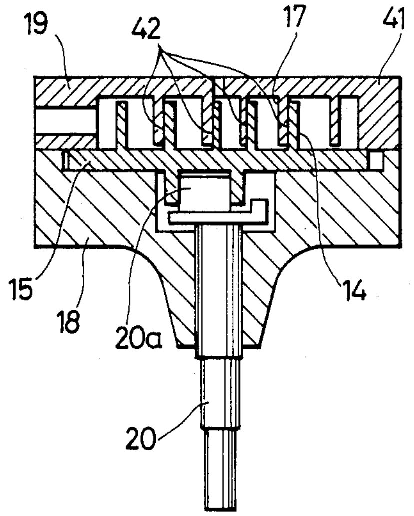
FIG. 3·2b
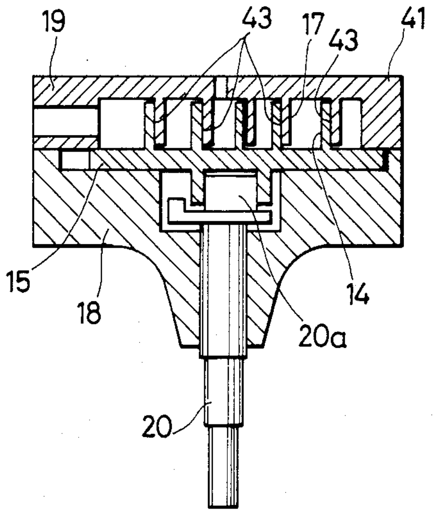

METHOD OF AND APPARATUS FOR POSITIONING COMPRESSOR SCROLL MEMBER

BACKGROUND OF THE INVENTION

The present invention relates to a method of positioning a stationary scroll member in the process of assembly of a scroll-type compressor and, more particularly, to positioning method and apparatus suitable for automating the assembly process.

A known scroll-type compressor has a stationary scroll member and an orbiting scroll member each being provided with wraps formed along an involute curve or a similar curve, both the scroll members being assembled with their wraps meshing. The orbiting scroll member is driven by a crankshaft so as to make an orbiting motion. In consequence, the volume of closed chambers formed between both scroll members progressively decreases from the outer portion towards the inner portion of the compressor. This type of compressor is shown, for example, in U.S. Pat. No. 3,884,599. Usually, the positioning of the scrolls is conducted by fitting pins in positioning holes formed in the scroll members. This method, however, necessitates machining for formation of the positioning holes thereby raising production cost, and cannot precisely position the scroll members because no consideration is given for compensation for in machining error.

SUMMARY OF THE INVENTION

Accordingly, an object of the invention is to provide an accurate and stable positioning method and apparatus which permits an automatic positioning of stationary and orbiting scroll members having spiral wraps, without necessitating the formation of positioning holes.

According to the invention, the stationary scroll member and the orbiting scroll member are assembled temporarily in a random manner and the orbiting scroll member is made to orbit progressively from the temporary position. During the progressive orbiting movement of the orbiting scroll member, the degree, position and direction of the contact between the wraps of both members are measured. Thus, the positional relationship between both scroll members is determined precisely and regardless of any error incurred during machining, on the basis of direct measurement on the finished wrap surfaces.

In some cases, the wrap surfaces of both scroll members do not contact each other when the orbiting scroll member is rotated from the temporary position. In such a case, positions of both scroll members may be fixed for final assembly, but a higher precision of positioning will be attained if the distance between both wrap surfaces is measured and wrap gap is evenly distributed.

The degree of contact between both wrap surfaces can be known from fluctuation in the torque of the crankshaft or a change in the load applied to the stationary scroll member. The direction or rotational position of contact between both wrap surfaces can be known through measurement rotation angle of the crankshaft.

BRIEF DESCRIPTION OF THE DRAWINGS

FIGS. 3.1*a*, 3.1*b*, 3.2*a* and 3.2*b* are illustrations of state of contact between an orbiting scroll member and a stationary scroll member;

DESCRIPTION OF THE PREFERRED EMBODIMENTS

Figure 1:
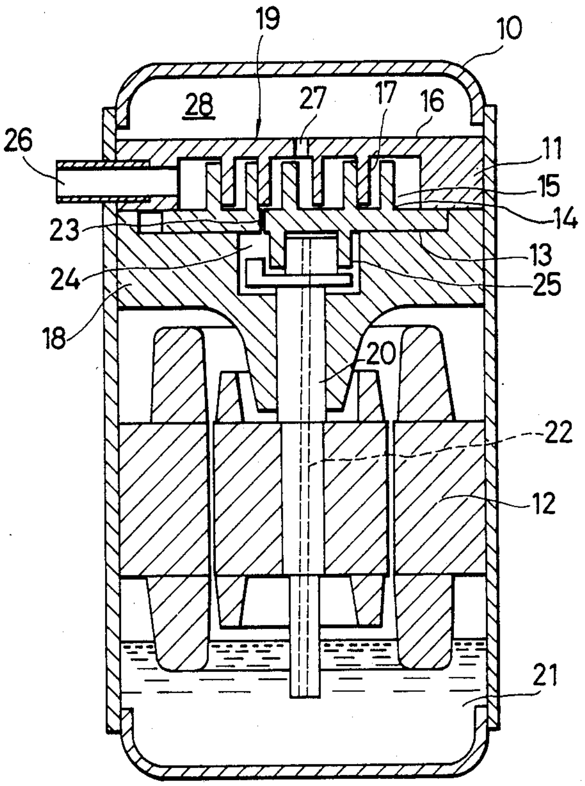
FIG. 1 is a sectional view of a scroll-type compressor.

An embodiment of the invention will be described with reference to FIGS. 1 to 5. A hermetic vessel 10 defines in its upper portion a compressor section 11 and in its lower portion a motor section. The compressor section 11 is composed of an orbiting scroll member 15 consisting of a flat end plate 13 and a spiral wrap 14 protruding upright therefrom, and a stationary scroll member 19 consisting of a flat end plate 16 and a spiral wrap 17 protruding upright therefrom, the orbiting scroll member 15 and the stationary scroll member 19 meshing, with the stationary scroll member fixed to a frame 18. A crankshaft 20 which is integral with the shaft of an electric motor 12 is immersed at its lower end in an oil pan 21 formed in the bottom of the hermetic vessel 10. An oil passage bore 22 formed in the crankshaft 20 opens in the lower end of the crankshaft at the center of the shaft 20 and also at an upper position which is offset from the axis of this shaft. A communication hole 23 is formed in the portion of the orbiting scroll member 15 which is subjected to an intermediate pressure between the suction and discharge pressures of the compressor. The communication hole 23 is communicated with an intermediate pressure chamber 24. The upper end of the crankshaft 20 fits in a boss 25 which is formed on the underside of the orbiting scroll member 15. Therefore, the orbiting scroll member 15 orbits in accordance with the rotation of the crankshaft 20 while allowing the boss 25 to orbit within the intermediate pressure chamber 24 in the frame 18. In consequence, the point of sealing contact between the wraps 14 and 17 of the orbiting and stationary scroll members 15, 19 is progressively moved such that a gas sucked through a suction pipe 26 is progressively compressed from the outer portion to the inner portion of the spiral form, and is discharged into a space 28 formed in the hermetic vessel 10 through a discharge port 27 formed in the center of the stationary scroll member 19. The gas is then discharged outside the compressor through a discharge pipe (not shown). Namely, the volume of the hermetic chamber formed by the wraps 14, 17 of the orbiting and stationary scroll members 15 and 19 and the end plates 13, 16 of these scroll members is progressively decreased so as to proressively raise the pressure as the position of the chamber is moved from the outer side to the center of the compressor. As stated before, the intermediate pressure between the suction and discharge pressures is introduced through the communication hole 23 into the intermediate pressure chamber 24 defined by the orbiting scroll member 15 and the frame 18. As a result, the orbiting scroll member 15 is pressed onto the stationary scroll member 19 by the force produced by the pressure differential between the intermediate pressure and the compression pressure in the compressor, thus maintaining sealing contact between the axial ends of both wraps 14, 17 and the end plates 16, 13. The interior of the hermetic vessel 10 is maintained at the same level as the discharge pressure which is higher than the intermediate pressure in the intermediate pressure chamber 24, so that the refrigerator oil is forced to flow upward through the oil passage bore 22 in the crankshaft 20 and supplied to various sliding parts, by the force produced by the pressure differential.

In the scroll-type machine of the type described, the walls of the wraps 14 and 17 of the stationary and orbiting scroll members 19 and 15 cooperate with each other in a sealing manner such as to form a closed chamber the volume of which is progressively decreased to increase the pressure. It is, therefore, essential that both scroll members 15, 19 are precisely positioned relative to each other when assembling both scroll members. More specifically, the stationary scroll member 19 has to be positioned and assembled at such a position that the wraps 14 and 17 of both scroll members 19 and 15 do not contact each other but leave a suitable gap therebetween, in all rotational positions of the crankshaft 20.

Hitherto, the stationary scroll member has been attached to the frame 18 manually by an operator who rotates the crankshaft 20 and finds the position at which the wraps 14, 17 of both scroll members 15, 19 do not contact each other. Since the operator must determine the positions solely by his sense of feel, this method depends largely on the experience of the operator, so that it is not very reliable. It has been proposed also that the positioning of the stationary scroll member be conducted by positioning reference holes formed at positions calculated on design drawing. This method, however, is somewhat imprecise because the precision of assembly is impaired by errors incurred during the machining of the reference holes and wraps.

To obviate these problems, the positioning apparatus of the invention incorporates a main base 30 on an upper portion 30*a* of which are disposed an X-axis feeding device 31 and a Y-axis feeding device 32 such that the moving directions orthogonally cross each other. A clamp chuck 33 for clamping the stationary scroll member 19 is secured to the underside of the X-axis feeding device 31. The clamp chuck 33 has three clamping claws 34 which are adapted to pinch and clamp the stationary scroll member 19. The X-axis feeding device 31 is secured to an X-axis feed base 31*a* such that an X-axis slide 31*b* is movable in one direction. A nut 31*c* is screwed to the X-axis slide 31*b*. An X-axis motor 31*e* fixed to the X-axis feeding base 31*a* has a shaft to one end of which is connected a bolt 31*b* which is screwed to the nut 31*c*. The X-axis slide 31*b* is adapted to be moved in the X-axis direction as the X-axis motor 31*e* operates. The Y-axis feeding device 32 has a construction similar to the X-axis feeding device 31, and is adapted to effect a feed of the X-axis feed base 31*a* fixed to the Y-axis slide 32*b* in the Y-axis direction.

A torque sensor 35 for detecting the degree of contact, i.e., the rotational torque, is secured to a lower portion 30*d* of the main base 30, together with a motor 37 for driving the crankshaft 20 and an angle detector 38 for detecting the rotation angle of the crankshaft 20. The torque sensor 35, motor 37 and the angle detector 38 are arranged on a line. The rotary shaft 39 is supported by a rotational bearing 30*e* on the main body 30 and carries at its upper end a clamp chuck 40 which is adapted to clamp the crankshaft 20 thereby connecting the rotary shaft 39 to the crankshaft 20. The clamp chuck 40 is provided with a pair of claws 40*a* which cooperate with each other in clamping therebetween the crankshaft 20. A reference numeral 60 designates a computing means such as a microcomputer, connected through a signal line 61 to the feeding devices 31, 32, torque sensor 35 and the angle detector 38. The setting of both scroll members and the rotation shaft work is conducted first by mounting the crankshaft 20 and the orbiting scroll 15 on the frame 18, turning the frame 18 into such a state that the stationary scroll member is placed on the frame 18, and attaching the frame 18 to the work mounting portion 30*b* of the main base 30. The work mounting portion 30*b* is provided with a hole 30*c* through which the crankshaft 20 is projected downward. A reference numeral 50 denotes a bolt tightening device which is adapted to drive the bolt 51 into the threaded hole 52 after positioning, thereby fixing both scroll members. A numeral 53 denotes a work mounting portion which is used for temporary attaching.

Figure 4:
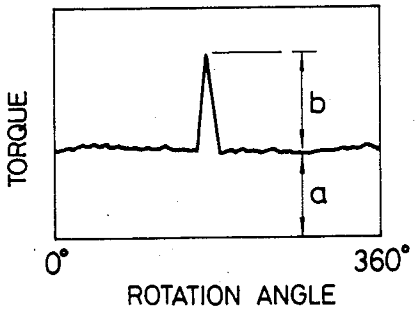
FIG. 4 is an illustration of the state of generation of a rotation torque.

The operation of the embodiment will be explained hereinunder. Both scroll members 15, 19 are temporarily fixed in meshing engagement with each other, and the crankshaft 20 is rotated by the motor 37, so that the orbiting scroll member 15 orbits. If the initial set position of the stationary scroll member 19 deviates from the ideal position, the wraps of the scroll members 15, 19 contact each other to cause an increase of the rotation torque once in one full rotation of the crankshaft. The state of contact between the wraps of the orbiting and stationary scroll members 15, 19 will be explained in connection with FIGS. 3.1*a*, 3.1*b*, 3.2*a* and 3.2*b* illustrating the states of contact, as well as FIG. 4. FIGS. 3.1*b* and 3.2*b* are sectional views of compression sections. More specifically, FIG. 3.1*b* shows a state in which the pin 20*a* on the crankshaft is in the left portion, while FIG. 3.2*b* shows the state in which the pin 20*a* is in the right position. FIGS. 3.1*a* and 3.2*a* show, respectively, the sections of the wraps in the states shown in FIGS. 3.1*b* and 3.2*b*. If the position of the stationary scroll member 19 deviates to the right from the ideal position, both wraps 14, 17 contact each other at a position where the pin 20*a* on the crankshaft has been rotated to left. Conversely, if the position of the stationary scroll member 19 deviates to the left from the ideal position, both wraps 14, 17 contact each other at a position 43 where the pin 20*a* of the crankshaft 20 has been rotated to the right. The same applies also to the case where the position of the stationary scroll member 19 deviates in any rotational direction. FIG. 4 shows the state of rotation torque, wherein a represents the torque required for driving the crankshaft, while b represents the load torque which is produced once during 360° of rotation of the crankshaft. The rotational direction at which the contact is taking place can be known by measuring the rotation angle of the crankshaft 20 at which the torque is increased. This in turn shows the direction of deviation of the stationary scroll member 19. The data concerning the degree of contact and the rotational direction of contact is transmitted to a microcomputer 60 through signal lines 61. The microcomputer 60 then performs a computation and delivers instruction signals to the X- and Y-axis feeding devices 31, 32. By operating the X- and Y-axis feeding devices 31, 32 so as to move the stationary scroll member 19 in the direction opposite to the direction of contact, the stationary scroll member 19 can be brought to a position where there is no load torque b. It is very rare that the rotational direction of contact coincides with either the X- or Y-axis. When the rotational direction of the contact does not coincide with the X-axis nor Y-axis, the components of movement in the X- and Y-axis directions is computed and the stationary scroll member

19 is moved both in the X- and Y-axis directions by amounts corresponding to the computed components. The thus fixed stationary scroll member 19 is fixed to the frame 18 by means of bolts at twelve positions by the operation of the bolt tightening device 50. Thus, the described embodiment offers an advantage in that the work which heretofore has relied upon the experience and skill of the worker is automated thereby assuring precise and stable positioning.

Figure 6:
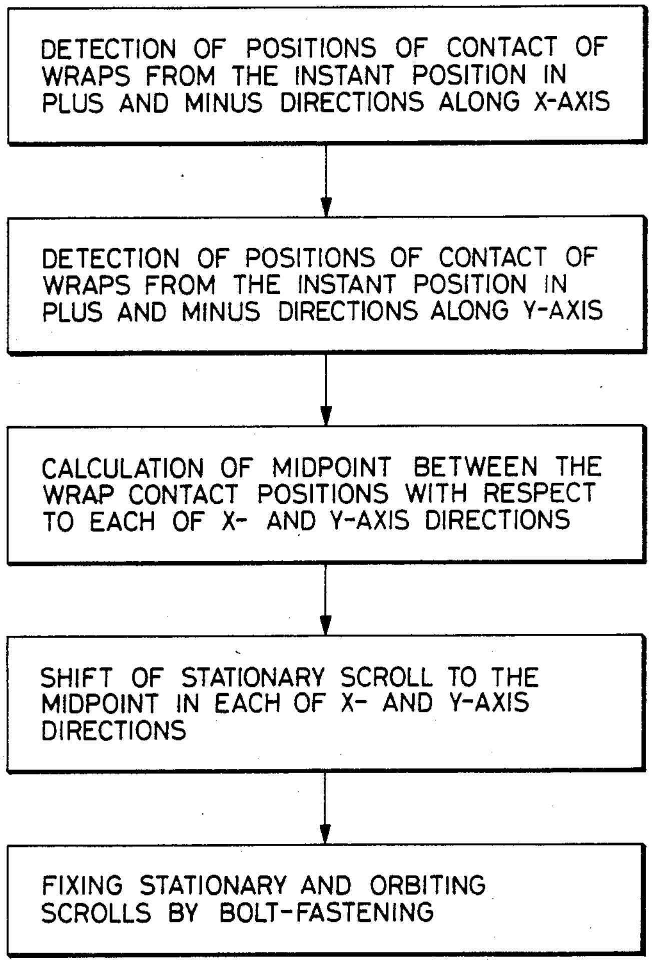
FIG. 6 is a block diagram of another embodiment.

In the described embodiment, positioning is conducted such as to set the stationary scroll member at a position where the wraps of both scroll members do not contact each other. It is to be understood, however, a higher precision of positioning can be achieved by a method in which, as shown in FIG. 6, the stationary scroll member is moved from the instant position both in plus and minus directions along the X-axis and the Y-axis such as to detect the positions of contact of wraps both in plus and minus directions along both axes, and positioning the stationary scroll member at midpoints between the contact positions both along the X- and Y-axes thereby equally distributing the wrap gap both in plus and minus directions.

Figure 2:
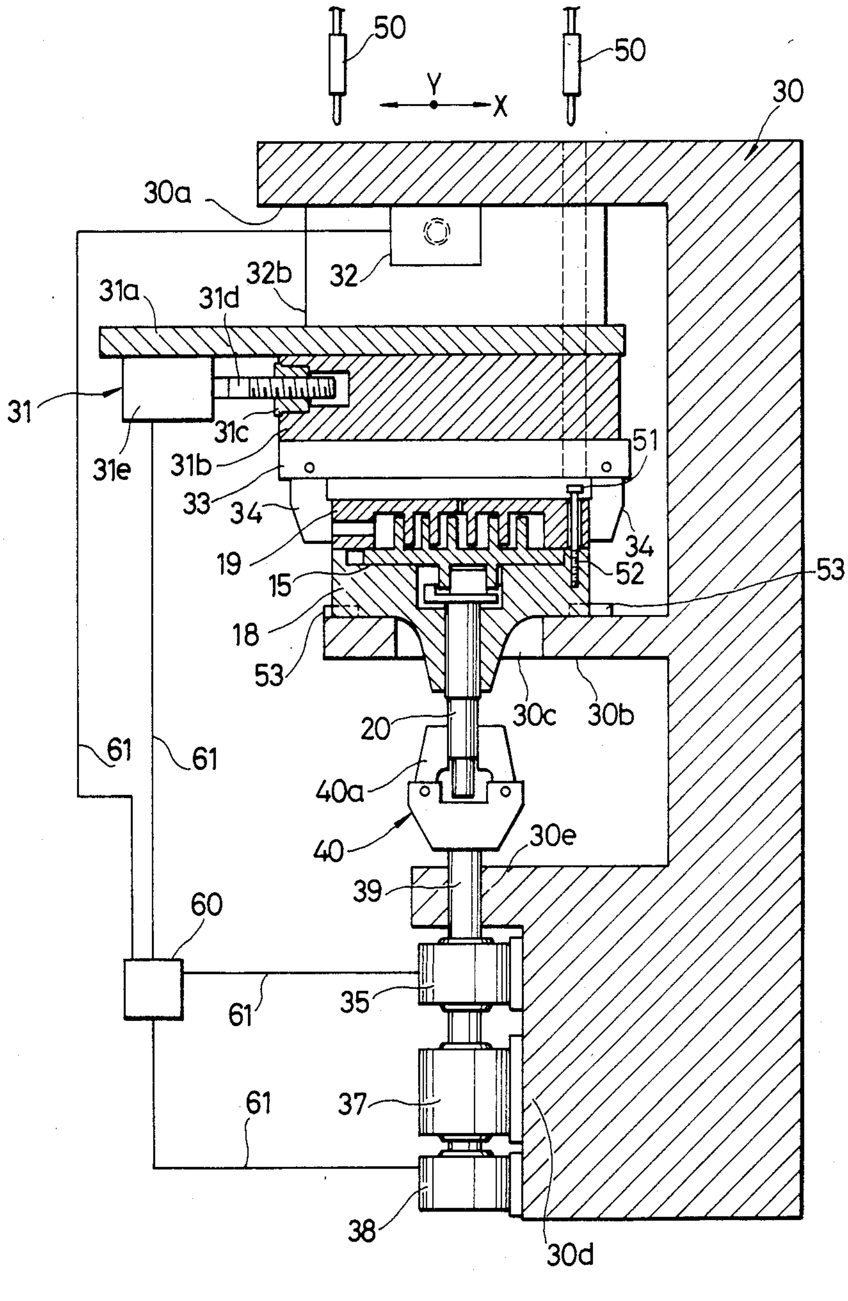
FIG. 2 is a sectional view of an embodiment incorporating a torque sensor.
Figure 5:
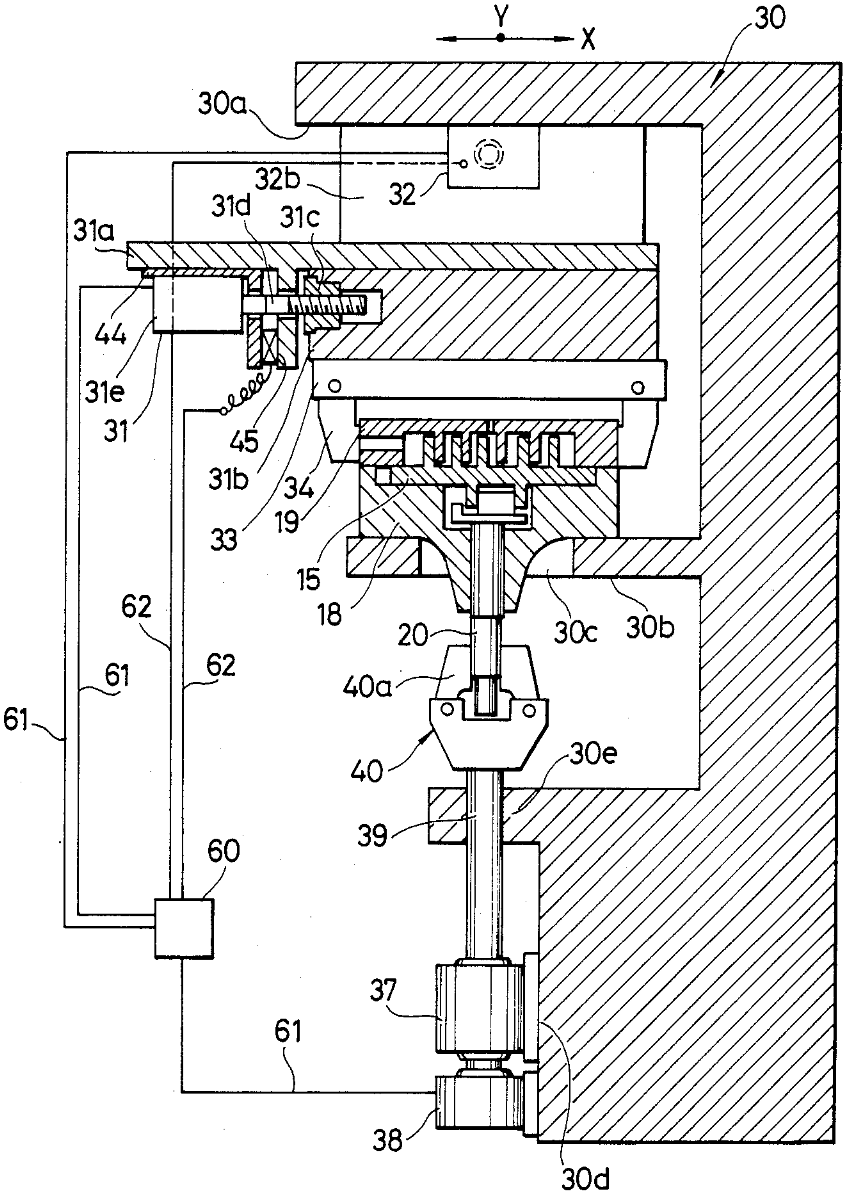
FIG. 5 is a sectional view of an embodiment incorporating a load sensor.

In the embodiment explained in connection with FIG. 2, the degree of contact between wraps of the scroll members is detected by sensing the rotation torque of the crankshaft. This, however, is only illustrative and the degree of contact may be detected by sensing the load applied to the stationary scroll member as a result of the contact, by means of a load sensor attached to the clamp chuck holding the stationary scroll member, X- or Y-axis feeding device or to the main base. The example shown in FIG. 5 has load sensors 45 attached to the X- and Y-axis feeding devices 31, 32. The load sensors 45 are connected to the microcomputer 60 through signal lines 62. The X-axis motor base 44 to which the X-axis motor 31*e* is secured is attached to the X-axis base 31*a* for a sliding motion only in the X-axis direction. The X-axis motor base 44 and the X-axis base 31*a* are connected to each other through an X-axis load sensor 45 and, therefore, the X-axis load sensor is capable of measuring the load applied parallel to the X-axis. The same applies also to the Y-axis. Using these load sensors, it is possible to detect the position where the wraps do not contact each other. In the case of the described example, the contact between the wraps is sensed by direct measurement of the load. In addition, measurement is made parallel to both the X- and Y-axes. This example, therefore, provides a higher precision of positioning as compared with the case where the torque sensor is used.

As has been described, according to the invention, it is possible to position the stationary scroll member and the orbiting scroll member in relation to each other automatically and precisely at such a position where the spiral wraps do not contact each other at all, without necessitating the formation of specific positioning holes.

What is claimed is

1. In a scroll-type fluid machine having a stationary scroll member and an orbiting scroll member each being provided with a wrap formed along an involute curve or a similar curve, said stationary and orbiting scroll members being assembled such that said wraps mesh, said orbiting scroll member being adapted to be driven by a crankshaft such as to make an orbiting motion, whereby the volume of a closed chamber formed between both scroll members are progressively moved from the outer portion to the inner portion of said scroll members while decreasing the volume, a method of positioning said scroll members comprising: temporarily positioning said scroll members; causing said orbiting scroll member to progressively orbit with respect to said stationary scroll member held at the temporary position and detecting, when said wraps of said scroll members are made to contact each other, the degree of contact of said scroll wraps; detecting the direction of contact between both wraps when both wraps are made to contact each other; inputting the data concerning the degree of contact and the direction of contact to a computing means such as to move said stationary scroll member in X- and Y-axis directions by amounts corresponding to the degree and direction of contact, thereby to avoid the contact between said wraps of both scroll members; and, while said stationary scroll member is held at the position where the contact is avoided, inserting bolts to bolt holes formed beforehand in both scroll members, thereby fastening both scroll members.

2. A method of positioning scroll members according to claim 1, wherein the degree of contact between said wraps of both scroll members, when the contact has taken place, is detected by sensing a change in the rotation torque of said crankshaft or a change in the load applied to said stationary scroll member.

3. A method of positioning scroll members according to claim 1, wherein the step of detecting the direction of contact between said wraps when the contact has taken place is conducted by sensing the angle of rotation of said crankshaft.

4. In a scroll-type fluid machine having a stationary scroll member and an orbiting scroll member each being provided with a wrap formed along an involute curve or a similar curve, said stationary and orbiting scroll members being assembled such that said wraps mesh, said orbiting scroll member being adapted to be driven by a crankshaft such as to make an orbiting motion, whereby the volume of a closed chamber formed between both scroll members which are progressively moved from the outer portion to the inner portion of said scroll members while decreasing the volume, a method of positioning said scroll members comprising: temporarily positioning said scroll members; causing said orbiting scroll member to progressively orbit with respect to said stationary scroll member held at the temporary position and detecting, when said wraps of said scroll members are made to contact each other, the degree of contact of said scroll wraps; detecting the direction of contact between both wraps when both wraps are made to contact each other; inputting the data concerning the degree of contact and the direction of contact to a computing means such as to move said stationary scroll member in X- and Y-axis directions by amounts corresponding to the degree and direction of contact, thereby to avoid the contact between said wraps of both scroll members; moving said stationary scroll member further in X- and Y-directions thereby measuring the distance travelled until both wraps are brought into contact; moving said stationary scroll member to the midpoint thus equally distributing the gap between said wraps; and, while said scroll members are held at the position where said gap is equally distributed, inserting bolts to bolt holes formed beforehand in both scroll members, thereby fastening both scroll members.

5. A method of positioning scroll members according to claim 4, wherein the degree of contact between said wraps of both scroll members, when the contact has taken place, is detected by sensing a change in the rotation torque of said crankshaft or a change in the load applied to said stationary scroll member.

6. A method of positioning scroll members according to claim 4, wherein the step of detecting the direction of contact between said wraps when the contact has taken place is conducted by sensing the angle of rotation of said crankshaft.

7. An apparatus for positioning a stationary scroll member and an orbiting scroll member of a scroll-type fluid machine, each of which is provided with a wrap formed along an involute curve or a similar curve, said stationary and orbiting scroll members being assembled such that said wraps mesh, said orbiting scroll member being adapted to be driven by a crankshaft such as to make an orbiting motion, whereby the volume of a closed chamber formed between both scroll members which are progressively moved from the outer portion to the inner portion of said scroll members while decreasing the volume, characterized by a main base having a portion for mounting X- and Y-axis feeding devices, a work mounting portion and a crankshaft drive mounting portion, said work mounting portion being adapted to temporarily fix a frame receiving said orbiting scroll member; a Y-axis feeding device mounted on said portion for mounting X-axis feeding device mounted on said portion for mounting X- and Y-axis feeding devices and adapted to feed the stationary scroll member which is clamped in the Y-axis direction; an X-axis feeding device for feeding said stationary scroll member secured to said Y-axis feeding device and clamped in the Y-axis direction; a stationary scroll clamp chuck secured to said X-axis feeding device and adapted to clamp said stationary scroll member; a motor mounted on said drive mounting portion; a crankshaft clamp chuck provided on the end of said motor and clamping said crankshaft engaging said orbiting scroll member; means provided on the shaft of said motor and adapted to detect the degree of contact between said wraps of both scroll members when the contact has taken place; means for detecting the direction of contact between said wraps of both scroll members when the contact has taken place; and means for fastening said scroll members by means of bolts after positioning of both scroll members.

8. An apparatus for positioning scroll members according to claim 7, wherein said means for detecting the degree of contact between said wraps when the contact has taken place includes a torque sensor for sensing the rotation torque of said crankshaft or a load sensor for sensing a change in the load applied to said stationary scroll member.

9. An apparatus for positioning scroll members according to claim 7, wherein said means for detecting the direction of contact between said wraps when the contact has taken place includes a crankshaft rotation angle detector.

* * * * *